United States Patent
Ishida

(10) Patent No.: US 12,135,138 B2
(45) Date of Patent: Nov. 5, 2024

(54) AIR CONDITIONING APPARATUS AND METHOD FOR CONTROLLING ROTATIONAL SPEED OF BLOWER FAN

(71) Applicant: DAIKIN INDUSTRIES, LTD., Osaka (JP)

(72) Inventor: Satoshi Ishida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 757 days.

(21) Appl. No.: 17/205,523

(22) Filed: Mar. 18, 2021

(65) Prior Publication Data

US 2021/0207872 A1 Jul. 8, 2021

Related U.S. Application Data

(63) Continuation of application No. PCT/JP2019/032244, filed on Aug. 19, 2019.

(30) Foreign Application Priority Data

Sep. 20, 2018 (JP) .................................. 2018-176192

(51) Int. Cl.
*F24F 11/77* (2018.01)
*F24F 11/49* (2018.01)
(Continued)

(52) U.S. Cl.
CPC .............. *F24F 11/52* (2018.01); *F24F 11/49* (2018.01); *F24F 11/74* (2018.01); *F24F 3/044* (2013.01); *F24F 11/39* (2018.01); *F24F 2110/40* (2018.01)

(58) Field of Classification Search
CPC .. F24F 11/39; F24F 11/49; F24F 11/52; F24F 11/72; F24F 11/74; F24F 11/75; F24F 11/77; F24F 2110/40
See application file for complete search history.

(56) References Cited

U.S. PATENT DOCUMENTS

2003/0157882 A1 8/2003 Boulanger et al.
2012/0118150 A1* 5/2012 Brizes ................ B01D 46/0036
96/16
(Continued)

FOREIGN PATENT DOCUMENTS

JP 3-148556 A 6/1991
JP 6-337128 A 12/1994
(Continued)

OTHER PUBLICATIONS

English translation of the International Preliminary Report on Patentability and Written Opinion of the International Searching Authority for International Application No. PCT/JP2019/032244, dated April 1, 2021.

(Continued)

*Primary Examiner* — Jonathan Bradford
(74) *Attorney, Agent, or Firm* — Birch, Stewart, Kolasch & Birch, LLP

(57) ABSTRACT

An air conditioning apparatus includes: a casing that includes an inlet port that takes in air and an outlet port to which a blow-out duct is connected, the casing forming an airflow path extending from the inlet port to the outlet port; a fan unit that is disposed in the casing and sends air from the inlet port to the outlet port in the airflow path; a ventilation member that is disposed in the airflow path and allows air to pass therethrough; a differential pressure gauge that measures a differential pressure between points in front of and behind the ventilation member; and a controller that adjusts a rotational speed of the fan unit based on a measured value of the differential pressure gauge.

19 Claims, 7 Drawing Sheets

(51) Int. Cl.
      *F24F 11/52*      (2018.01)
      *F24F 11/74*      (2018.01)
      *F24F 3/044*     (2006.01)
      *F24F 11/39*      (2018.01)
      *F24F 110/40*    (2018.01)

(56) References Cited

U.S. PATENT DOCUMENTS

| | | | |
|---|---|---|---|
| 2015/0276248 A1* | 10/2015 | Bailey | F24F 13/22 |
| | | | 454/356 |
| 2015/0362205 A1 | 12/2015 | Hung et al. | |
| 2018/0112886 A1 | 4/2018 | Boody | |

FOREIGN PATENT DOCUMENTS

| | | |
|---|---|---|
| JP | 2004-198271 A | 7/2004 |
| JP | 2004-278929 A | 10/2004 |
| JP | 2009-14251 A | 1/2009 |
| JP | 2009-36399 A | 2/2009 |
| JP | 2018-132235 A | 8/2018 |

OTHER PUBLICATIONS

Extended European Search Report for European Application No. 19863011.3, dated Sep. 9, 2021.
International Search Report issued in PCT/JP2019/032244 (PCT/ISA/210), dated Sep. 10, 2019.

* cited by examiner

AIR CONDITIONING APPARATUS AND METHOD FOR CONTROLLING ROTATIONAL SPEED OF BLOWER FAN

CROSS REFERENCE TO RELATED APPLICATIONS

This application is a Continuation of PCT International Application No. PCT/JP2019/032244, filed on Aug. 19, 2019, which claims priority under 35 U.S.C. 119 (a) to Patent Application No. 2018-176192, filed in Japan on Sep. 20, 2018, all of which are hereby expressly incorporated by reference into the present application.

TECHNICAL FIELD

The present disclosure relates to an air conditioning apparatus and a method for controlling the rotational speed of a fan.

BACKGROUND ART

PTL 1 discloses an air conditioning system including: a differential pressure measuring unit that measures the differential pressure between points in front of and behind a louver having a blade that is fixed so as to be inclined with respect to the airflow direction of air flowing in a duct; and an actual airflow rate measuring unit that acquires the actual flow rate of air that passes through the louver from the differential pressure measured by the differential pressure measuring unit.

CITATION LIST

Patent Literature

[PTL 1] Japanese Unexamined Patent Application Publication No. 2004-198271

SUMMARY

According to a first aspect of the present disclosure, an air conditioning apparatus (1) is connected via a duct (2) to a plurality of blow-out ports (9a to 9h) formed in an air-conditioning target space (7a, 7b) and that sends air to the blow-out ports (9a to 9h). The air conditioning apparatus (1) includes: a casing (10) that includes an inlet port (16) that takes in air and an outlet port (17) to which the duct (2) is connected, the casing (10) forming an airflow path extending from the inlet port (16) to the outlet port (17); a fan (25) that is disposed in the casing (10) and sends air from the inlet port (16) to the outlet port (17) in the airflow path; a ventilation member (20) that is disposed in the airflow path and allows air to pass therethrough; a differential pressure gauge (53) that measures a differential pressure between points in front of and behind the ventilation member (20); and a controller (50) that adjusts a rotational speed of the fan (25) based on a measured value of the differential pressure gauge (53).

DESCRIPTION OF EMBODIMENTS

First Embodiment

A first embodiment will be described. An air handling unit (1) according to the present embodiment is configured to adjust the temperature of air and to humidify air. The air handling unit (1) is provided in a building or the like and constitutes a part of an air conditioning system (3).

—Configuration of Air Conditioning System—

Figure 1:
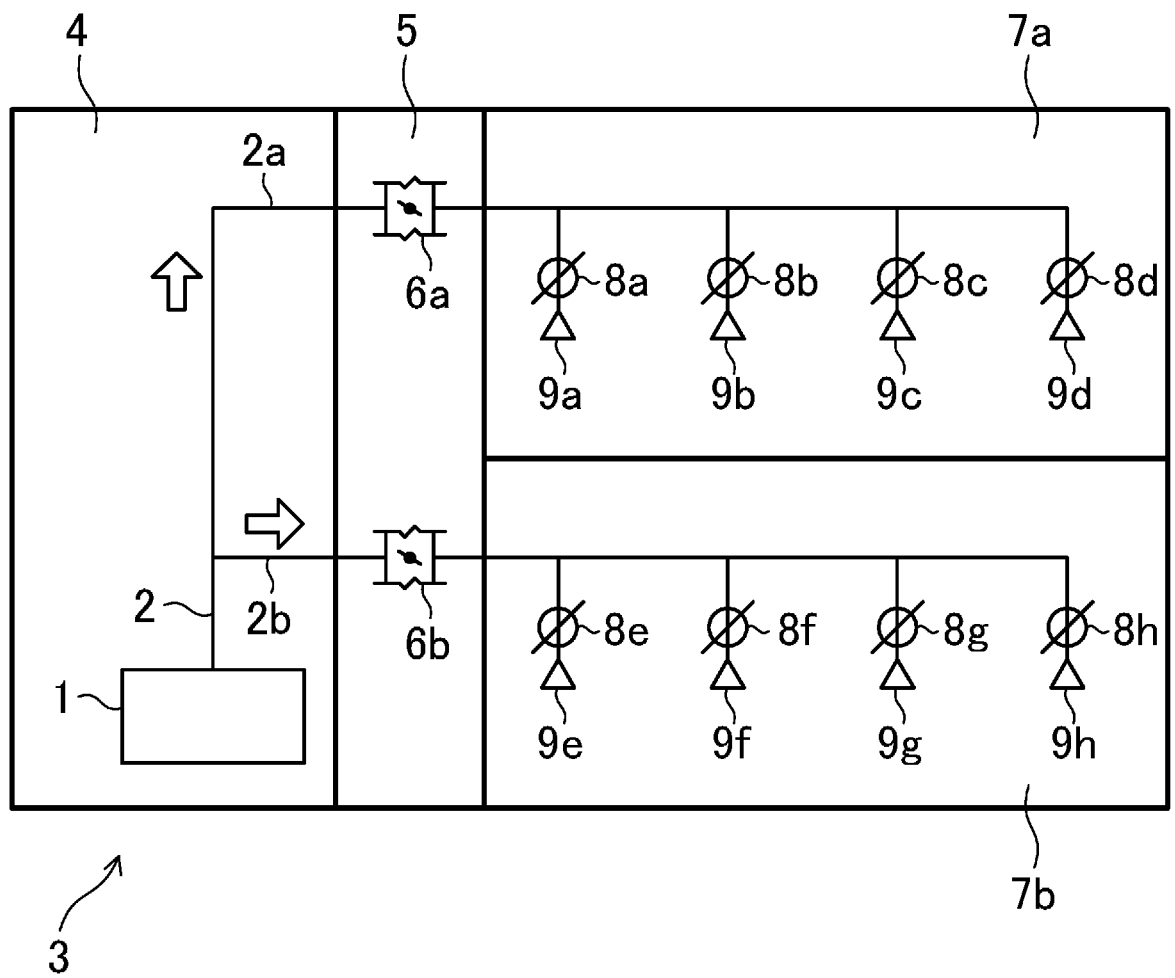
FIG. 1 is a schematic view illustrating the configuration of an air conditioning system according to a first embodiment.

As illustrated in FIG. 1, the air conditioning system (3) includes the air handling unit (1), a blow-out duct (2), distribution control dampers (6a, 6b), and airflow-rate control dampers (8a to 8h).

The air handling unit (1) constitutes an air conditioning apparatus. The air handling unit (1) is disposed, for example, in a machine room (4) of a building. The air handling unit (1) sends conditioned air to a plurality of blow-out ports (9a to 9h) that are formed in the ceilings of a first room (7a) and a second room (7b) as air-conditioning target spaces. The configuration of the air handling unit (1) will be described below.

The blow-out duct (2) as a duct extends from the machine room (4) to each blow-out port (9a to 9h) through a corridor (5) and a space above the ceiling of each room (7a, 7b). The blow-out duct (2) connects the air handling unit (1) and each blow-out port (9a to 9h). The blow-out duct (2) branches in the machine room (4) and includes a first blow-out duct (2a) that extends from the machine room (4) toward the first room (7a) and a second blow-out duct (2b) that extends from the machine room (4) toward the second room (7b).

The distribution control dampers (6a, 6b) are each a variable-opening damper for flow rate control. The distribution control dampers (6a, 6b) include a first distribution control damper (6a) and a second distribution control damper (6b). The first distribution control damper (6a) is disposed in the corridor (5) and within the first blow-out duct (2a). The second distribution control damper (6b) is disposed in the corridor (5) and within the second blow-out duct (2b). It is possible to adjust the ratio of air supplied from the air handling unit (1) to the first room (7a) to air supplied from the air handling unit (1) to the second room (7b) by controlling the opening degree of the first distribution control damper (6a) and the opening degree of the second distribution control damper (6b).

The airflow-rate control dampers (8a to 8h) are provided in the rooms (7a, 7b) so as to correspond to respective blow-out ports (9a to 9h). When the opening degree of each of the airflow-rate control dampers (8a to 8h) is adjusted, the airflow rate of air blown out from the blow-out port (9a to 9h) corresponding to the airflow-rate control damper (8a to 8h) changes.

—Configuration of Air Handling Unit—

Figure 2:
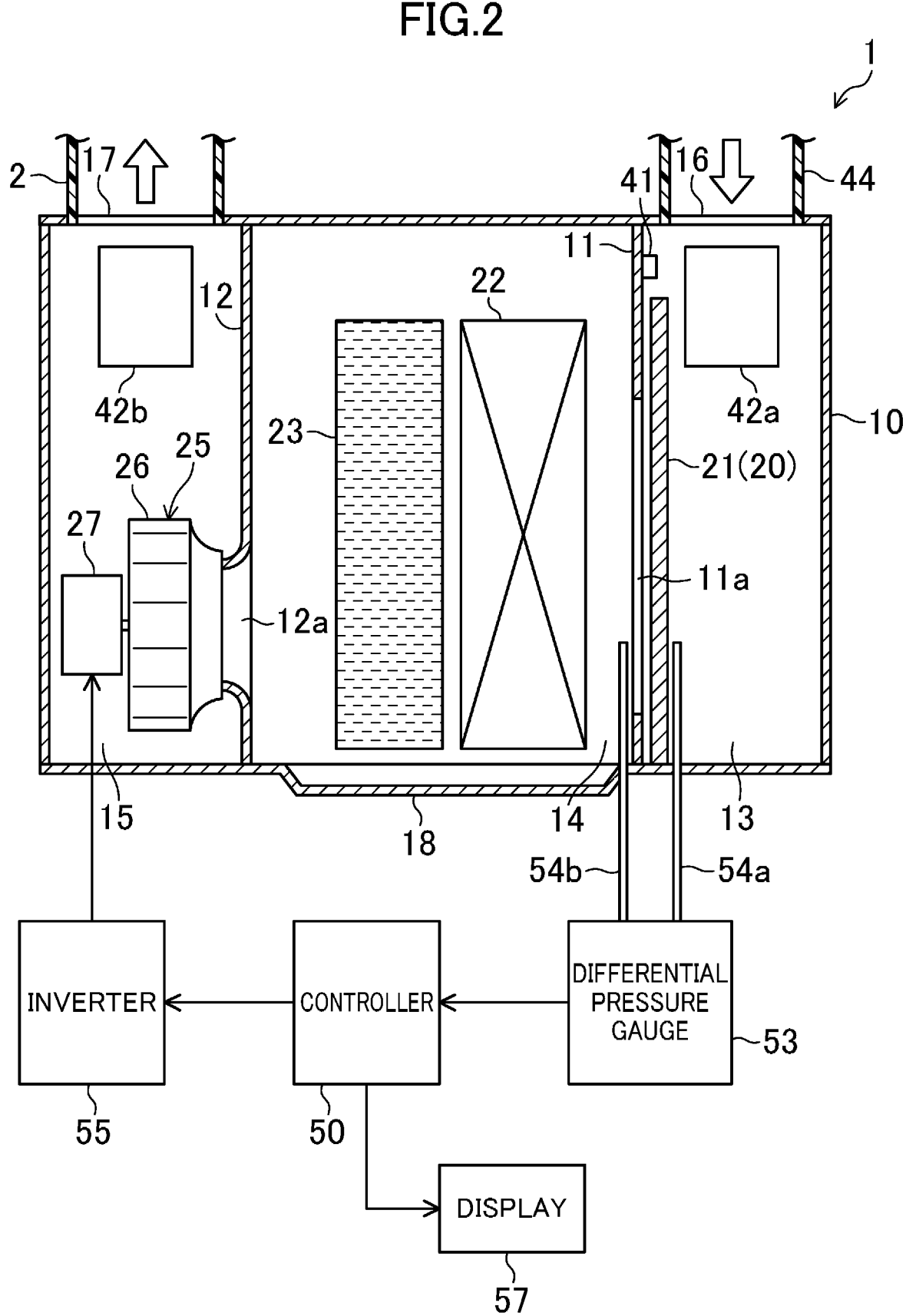
FIG. 2 is a schematic sectional view illustrating the configuration of an air handling unit according to the first embodiment.

As illustrated in FIG. 2, the air handling unit (1) includes a casing (10) having a hollow rectangular-parallelepiped shape. The inner space of the casing (10) is divided by a first partition plate (11) and a second partition plate (12) into an inlet chamber (13), an intermediate chamber (14), and an outlet chamber (15). In the casing (10), the inlet chamber (13), the intermediate chamber (14), and the outlet chamber (15) are arranged in order from one end toward the other end thereof in the longitudinal direction.

The top panel of the casing (10) has an inlet port (16) in a part thereof facing the inlet chamber (13) and an outlet port (17) in a part thereof facing the outlet chamber (15). An intake duct (44) is connected to the inlet port (16). The blow-out duct (2) is connected to the outlet port (17). The air handling unit (1) takes air from the intake duct (44) into the casing (10) through the inlet port (16) and sends air from the outlet port (17) to the blow-out duct (2). The casing (10) forms an airflow path extending from the inlet port (16) to the outlet port (17) through the inlet chamber (13), the intermediate chamber (14), and the outlet chamber (15) in order. A bottom plate (34) of the casing (10) constitutes a drain pan (18) having a part that faces the intermediate chamber (14) and is recessed downward.

The first partition plate (11) has a first opening (11a). The inlet chamber (13) communicates with the intermediate chamber (14) through the first opening (11a). The second partition plate (12) has a second opening (12a). The intermediate chamber (14) communicates with the outlet chamber (15) through the second opening (12a).

The air handling unit (1) includes an air filter (21), flow-regulating members (42a, 42b), a heat exchanger (22), a humidifying element (23), a fan unit (25), a differential pressure gauge (53), a controller (50), an inverter (55), and a display (57). The air filter (21) and the inlet flow-regulating member (42a) are disposed in the inlet chamber (13). The heat exchanger (22) and the humidifying element (23) are disposed in the intermediate chamber (14). In the intermediate chamber (14), the humidifying element (23) is disposed on the downstream side of the heat exchanger (22). The fan unit (25) and the outlet flow-regulating member (42b) are disposed in the outlet chamber (15).

The air filter (21) is disposed in the airflow path and allows air to pass therethrough. The air filter (21) constitutes a ventilation member (20). The air filter (21) is a member for purifying air by trapping foreign substances, such as dust, included in air. The air filter (21) is provided so as to cover the first opening (11a). A reset switch (41) is disposed above the air filter (21). The reset switch (41) is, for example, a button switch. An operator presses the reset switch (41) when the operator has replaced an air filter (21) that has trapped foreign substances with a new air filter (21). When the reset switch (41) is pressed, the reset switch (41) transmits a reset signal to the controller (50).

The inlet flow-regulating member (42a) is disposed in the inlet chamber (13) at a position that is below the inlet port (16) and on the upstream side of the air filter (21) in an airflow path. The inlet flow-regulating member (42a) suppresses turbulence of airflow. The inlet flow-regulating member (42a) is constituted by a plurality of flow regulating plates that are arranged at a predetermined interval in the depth direction of the casing (10) (direction perpendicular to the plane of FIG. 2).

The heat exchanger (22) is disposed in the airflow path and allows air to pass therethrough. The heat exchanger (22) is a so-called cross-fin fin-and-tube heat exchanger. The heat exchanger (22) adjusts the temperature of air by causing heating medium water, which is supplied from a heat source device (not shown), to exchange heat with the air. The heat source device is, for example, a chiller device that cools or heats heat medium water by performing a refrigeration cycle.

The humidifying element (23) is a member for evaporating water, which is supplied thereto, by causing the water to contact air. The humidifying element (23) is made of a sponge-shaped or non-woven-cloth-shaped resin, can hold a certain amount of water, and allows air to pass therethrough. A plurality of humidifying elements (23) are arranged in the depth direction of the casing (10) (direction perpendicular to the plane of FIG. 2).

The fan unit (25) constitutes a fan. The fan unit (25) includes an impeller (26) and a fan motor (27) including an AC motor for driving the impeller (26). The fan motor (27) is connected to the inverter (55). The impeller (26) is disposed in such a way that an intake port thereof covers the second opening (12a), and blows out air, which is sucked from the intake port, in the circumferential direction. The fan unit (25) sends air from the inlet port (16) to the outlet port (17) in the airflow path.

The outlet flow-regulating member (42b) is disposed in the outlet chamber (15) at a position below the outlet port (17) and on the downstream side of the fan unit (25) in the airflow path. The outlet flow-regulating member (42b) suppresses turbulence of airflow. The outlet flow-regulating member (42b) is constituted by a plurality of flow regulating plates that are arranged at a predetermined interval in the depth direction of the casing (10) (direction perpendicular to the plane of FIG. 2).

The differential pressure gauge (53) measures the differential pressure between points in front of and behind the air filter (21). To be specific, the differential pressure gauge (53) measures the difference between the static pressure of an upstream part of the air filter (21) and the static pressure of a downstream part of the air filter (21). The differential pressure gauge (53) includes an upstream differential pressure take-out pipe (54a) and a downstream differential pressure take-out pipe (54b). An end of the upstream differential pressure take-out pipe (54a) is positioned on the upstream side of the air filter (21). An end of the downstream differential pressure take-out pipe (54b) is positioned on the downstream side of the air filter (21). The differential pressure gauge (53) is configured to be capable of communicating with the controller (50). The differential pressure gauge (53) transmits a measured value to the controller (50).

The controller (50) is configured to be capable of communicating with the reset switch (41), the differential pressure gauge (53), the inverter (55), and the display (57). The controller (50) controls the rotational speed of the fan motor (27) by using the inverter (55) based on the measured value of the differential pressure gauge (53). The controller (50) determines whether a trial run (described below) has finished.

The display (57) constitutes a display unit and a notifying unit. The display (57) displays an airflow rate that is converted from the measured value of the differential pressure gauge (53). The display (57) receives from the controller (50) that the trial run has finished. The display (57)

displays that the trial run has finished and notifies the fact to an operator. Examples of the display (57) include various display devices such as a monitor provided in a terminal, such as a smartphone, or in the controller (50).

—Operation—

<Trial Run>

After the air handling unit (1) has been installed in the machine room (4), a trial run is performed to adjust the airflow rate of air blown out from the outlet port (17). In the trial run, an operator controls the opening degrees of the distribution control dampers (6a, 6b) and the airflow-rate control dampers (8a to 8h) so that the blow-out airflow rate of each of the blow-out ports (9a to 9h) becomes a corresponding set value. When the opening degrees of the distribution control dampers (6a, 6b) and the airflow-rate control dampers (8a to 8h) are changed in a state in which the rotational speed of the fan motor (27) is constant, the air resistance in the blow-out duct (2) changes, the blow-out airflow rate of the air handling unit (1) changes, and, as a result, the differential pressure between points in front of and behind the ventilation member (20) changes. In the trial run, the controller (50) controls the rotational speed of the fan motor (27) so that the differential pressure between points in front of and behind the ventilation member (20) falls within a predetermined target range.

To be specific, in the trial run, the controller (50) controls the rotational speed of the fan motor (27) by using the inverter (55) so that the measured value of the differential pressure gauge (53) becomes a set differential pressure that has been predetermined in accordance with the ventilation member (20). In other words, the controller (50) controls the rotational speed of the fan motor (27) based on the differential pressure between points in front of and behind the air filter (21) as the ventilation member (20) (rotational-speed controlling step). The trial run normally finishes on condition that the measured value of the differential pressure gauge (53) has become the set differential pressure (for example, on condition that the measured value of the differential pressure gauge (53) has fallen within a predetermined target range). Even if the measured value of the differential pressure gauge (53) cannot be controlled to the set differential pressure within a predetermined time because, for example, an appropriate fan unit is not used, the trial run finishes with an indication that an error has occurred. The controller (50) transmits to the display (57) a signal indicating that the trial run has finished, and the display (57) displays that the trial run has finished. The controller (50) stores the rotational speed of the fan motor (27) controlled in the trial run.

<Normal Operation>

In a normal operation, the controller (50) performs an operation while fixing the rotational speed of the fan motor (27) so that the fan motor (27) rotates at a speed controlled in the trial run.

<Control when Air Filter is Clogged>

Figure 3:
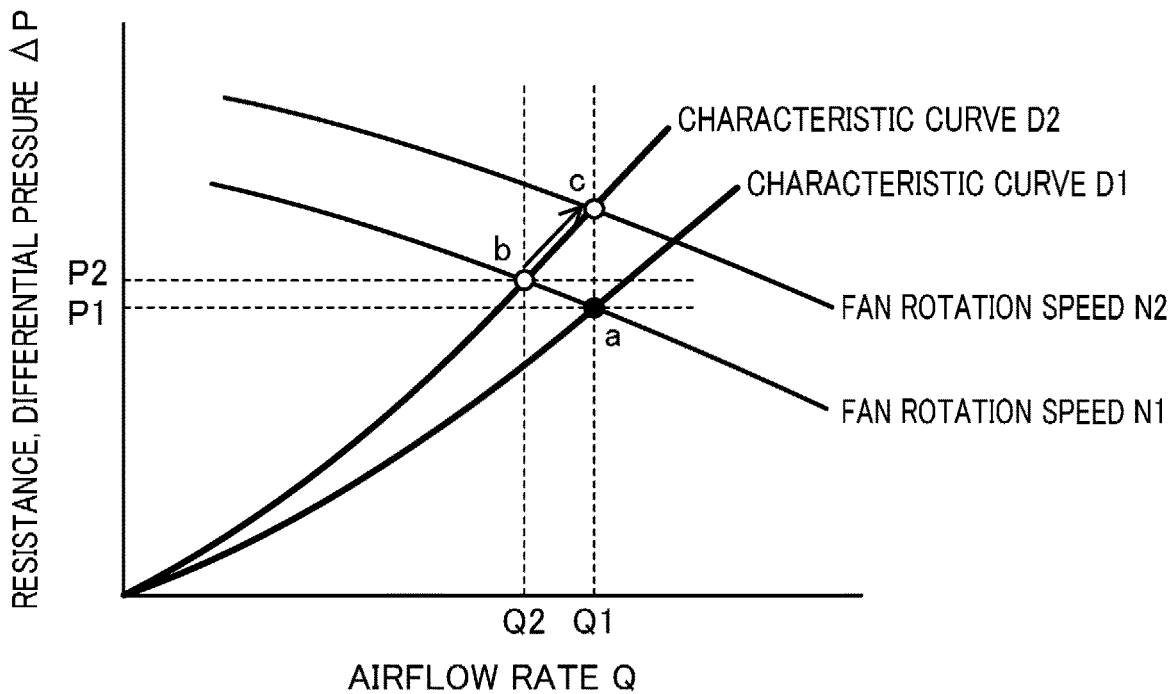
FIG. 3 is a graph illustrating behavior when an air filter is clogged in the air handling unit according to the first embodiment.

FIG. 3 is a graph illustrating behavior when the air filter (21) is clogged in the air handling unit (1).

The characteristic curve D1 in FIG. 3 represents the relationship between the airflow rate (Q) of air blown out from the outlet port (17) and the measured value of the differential pressure gauge (53) when the air filter (21) is new. The characteristic curve D2 in FIG. 3 represents the relationship between the airflow rate (Q) of air blown out from the outlet port (17) and the measured value of the differential pressure gauge (53) when foreign substances adhere to the air filter (21).

The curve N1 in FIG. 3 represents the fan characteristics at "the rotational speed of the fan motor (27) that is controlled in the trial run so that the measured value of the differential pressure gauge (53) becomes a set differential pressure (P1 in FIG. 3). The curve N2 in FIG. 3 represents the fan characteristics at "the rotational speed of the fan motor (27) at which the airflow rate of air blown out from the outlet port (17) becomes Q1 when foreign substances adhere to the air filter (21)".

For example, in a normal operation immediately after the trial run has normally finished, the controller (50) sets the rotational speed of the fan motor (27) to a rotational speed corresponding to the curve N1 in FIG. 3 so that the measured value of the differential pressure gauge (53) becomes the set differential pressure. At this time, the airflow rate of air blown out from the outlet port (17) is Q1 in FIG. 3.

As the operation time of the normal operation elapses, foreign substances adhere to the air filter (21). Therefore, the airflow rate of air blown out from the outlet port (17) decreases to Q2 in FIG. 3. As a result, the measured value of the differential pressure gauge (53) becomes P2 in FIG. 3, which is greater than the set differential pressure P1. That is, the state of the airflow rate and the differential pressure in the air handling unit (1) shifts from the point a to the point b in FIG. 3.

In accordance with the difference between the measured value of the differential pressure gauge (53) (P2 in FIG. 3) and the set differential pressure (P1 in FIG. 3), the controller (50) increases the rotational speed of the fan motor (27) from a rotational speed corresponding to the curve N1 in FIG. 3 to a rotational speed corresponding to the curve N2 in FIG. 3. At this time, the larger the difference between the measured value of the differential pressure gauge (53) and the set differential pressure, the controller (50) increases the rotational speed of the fan motor (27) by a larger amount. Thus, the relationship between the airflow rate (Q) and the differential pressure (P) shifts from the point b to the point c in FIG. 3, and the airflow rate of air blown out from the outlet port (17) returns to Q1 in FIG. 3. Accordingly, even when foreign substances adhere to the air filter (21), the airflow rate of air blown out from the outlet port (17) can be suppressed from decreasing.

As described above, when an operator replaces the air filter (21) that has trapped foreign substances with a new air filter (21), the operator presses the reset switch (41). When receiving the reset signal descried above, the controller (50) returns the rotational speed of the fan motor (27) to a rotational speed at the time when the normal operation started (a rotational speed corresponding to the curve N1 in FIG. 3). By doing so, it is possible to suppress the airflow rate of air blown out from the outlet port (17) from becoming excessive after the air filter (21) has been replaced.

<Control when Distribution Control Damper is Fully Closed>

Figure 4:
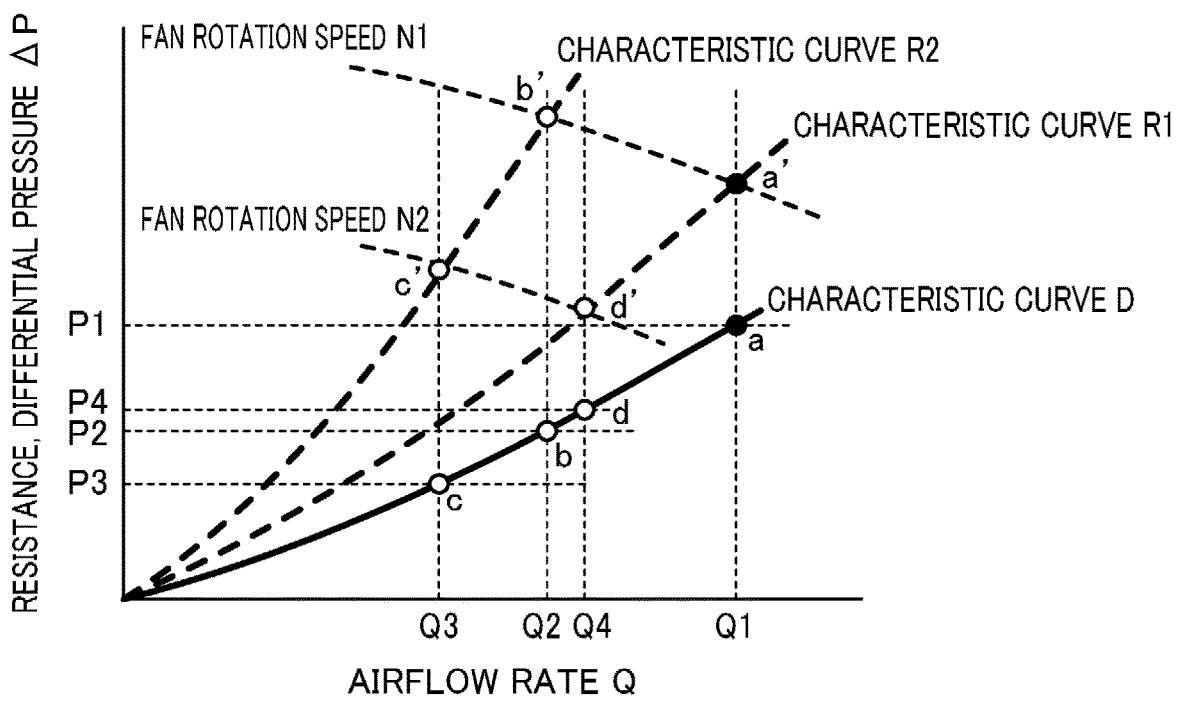
FIG. 4 is a graph illustrating behavior when one damper is fully closed in the air handling unit according to the first embodiment.

FIG. 4 is a graph illustrating behavior when, for example, the first distribution control damper (6a), among the distribution control dampers (6a, 6b), is fully closed in the air handling unit (1).

The characteristic curve D in FIG. 4 represents the relationship between the airflow rate (Q) of air blown out from the outlet port (17) and the measured value of the differential pressure gauge (53). The characteristic curve R1 in FIG. 4 represents the relationship between "the airflow rate (Q) of air blown out from the outlet port (17)" and "the sum of the air resistance in the airflow path and the air resistance in the blow-out duct (2) (the total resistance)", "at a time when the trial run normally finishes" or "at a time when foreign substances adhere to the air filter (21) and the rotational speed of the fan motor (27) is increased", in a state in which the first distribution control damper (6a) and the second distribution control damper (6b) are opened. The characteristic curve R2 in FIG. 4 represents the relationship between the airflow rate (Q) of air blown out from the outlet port (17) and the total resistance at a time when the first distribution control damper (6a) is fully closed from the state of the characteristic curve R1.

The curve N1 in FIG. 4 represents fan characteristics at "the rotational speed of the fan motor (27) controlled so that the measured value of the differential pressure gauge (53) becomes the set differential pressure (P1 in FIG. 4) in the trial run". The curve N2 in FIG. 4 represents fan characteristics at "the rotational speed of the fan motor (27) at which the airflow rate of air blown out from the outlet port (17) becomes Q3 when the first distribution control damper (6a) is fully closed".

During the normal operation, the controller (50) sets the rotational speed of the fan motor (27) to a rotational speed corresponding to the curve N1 in FIG. 4 so that the measured value of the differential pressure gauge (53) becomes the set differential pressure (P1 in FIG. 4). At this time, the total resistance has a value corresponding to a point a' in FIG. 4.

If the first distribution control damper (6a) is fully closed when, for example, the first room (7a) is not used, the air resistance in the blow-out duct (2) increases in a short time. When the air resistance in the blow-out duct (2) increases, the airflow rate of air blown out from the outlet port (17) decreases from Q1 to Q2, and the measured value at the differential pressure gauge (53) decreases from P1 to P2. In other words, the state of the airflow rate and the differential pressure in the air handling unit (1) shifts from the point a to the point b in FIG. 4. Then, the total resistance increases from a value corresponding to the point a' to a value corresponding to the point b' in a short time.

The controller (50) detects that the measured value of the differential pressure gauge (53) has decreased by "a value (a first predetermined value) corresponding to the difference between P1 and P2" or greater within a first predetermined time (in the present embodiment, 10 seconds), and reduces the rotational speed of the fan motor (27) to a first correction speed that is a rotational speed corresponding to the curve N2 in FIG. 4. Thus, the airflow rate of air blown out from the outlet port (17) decreases from Q2 to Q3, and the measured value at the differential pressure gauge (53) decreases from P2 to P3. In other words, the state of the airflow rate and the differential pressure in the air handling unit (1) shifts from the point b to the point c in FIG. 4. Then, the total resistance decreases from a value corresponding to the point b' to a value corresponding to the point c'. Thus, the flow rate of air that flows in the second blow-out duct (2b) increases, and the airflow to the second room (7b) can be suppressed from becoming excessive.

When the first distribution control damper (6a), which has been fully closed, is returned to the original opening degree, the air resistance in the blow-out duct (2) decreases in a short time. When the air resistance in the blow-out duct (2) decreases, the airflow rate of air blown out from the outlet port (17) increases from Q3 to Q4, and the measured value at the differential pressure gauge (53) increases from P3 to P4. In other words, the state of the airflow rate and the differential pressure in the air handling unit (1) shifts from the point c to the point d in FIG. 4. Then, the total resistance decreases from a value corresponding to a point c' to a value corresponding to the point d' in a short time.

The controller (50) detects that the measured value of the differential pressure gauge (53) has increased by "a value corresponding to the difference between P3 and P4 (a second predetermined value)" or greater within a second predetermined time (in the present embodiment, 10 seconds) when the fan motor (27) is rotating at a rotational speed corresponding to the curve N2 in FIG. 4 (first correction speed), and increases the rotational speed of the fan motor (27) to a rotational speed corresponding to the curve N1 in FIG. 4. Thus, the airflow rate of air blown out from the outlet port (17) increases from Q4 to Q1, and the measured value at the differential pressure gauge (53) increases from P4 to P1. In other words, the state of the airflow rate and the differential pressure in the air handling unit (1) shifts from the point d to the point a in FIG. 4. Then, the total resistance increases from a value corresponding to a point d' to a value corresponding to the point a'. Thus, the flow rate of air that flows in the second blow-out duct (2b) can be returned to the original flow rate.

<Control when Opening Degree of Airflow-Rate Control Damper Increases>

Figure 5:
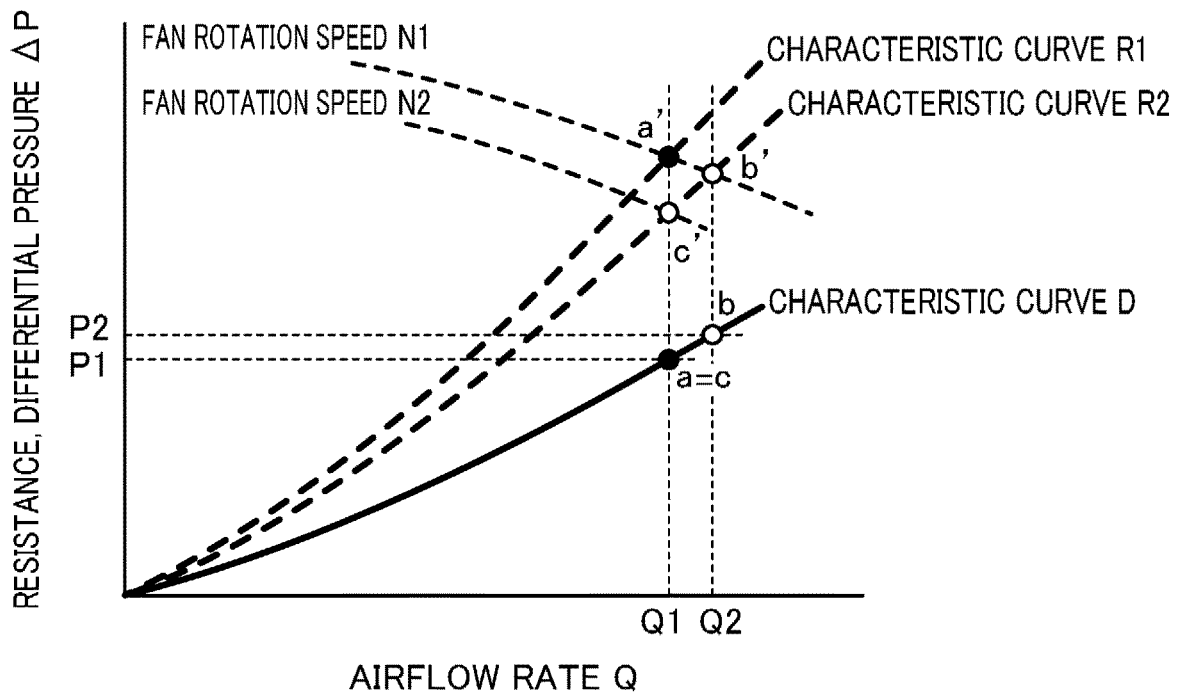
FIG. 5 is a graph illustrating behavior when the opening degree of one damper is increased in the air handling unit according to the first embodiment.

FIG. 5 is a graph illustrating behavior when the opening degree of, for example, the first airflow-rate control damper (8a), among the airflow-rate control dampers (8a to 8h), increases in the air handling unit (1).

The characteristic curve D in FIG. 5 represents the relationship between the airflow rate (Q) of air blown out from the outlet port (17) and the measured value of the differential pressure gauge (53). The characteristic curve R1 in FIG. 5 represents the relationship between "the airflow rate (Q) of air blown out from the outlet port (17)" and "the total resistance at a time when the trial run normally finishes in a state in which each airflow-rate control damper (8a to 8h) is opened or at a time when foreign substances adhere to the air filter (21) and the rotational speed of the fan motor (27) is increased". The characteristic curve R2 in FIG. 5 represents the relationship between the airflow rate (Q) of air blown out from the outlet port (17) and the total resistance at a time when the opening degree of the first airflow-rate control damper (8a) increases from the state of the characteristic curve R1.

The curve N1 in FIG. 5 represents fan characteristics at "the rotational speed of the fan motor (27) controlled so that the measured value of the differential pressure gauge (53) becomes the set differential pressure (P1 in FIG. 5) in the trial run". The curve N2 in FIG. 5 represents fan characteristics at "the rotational speed of the fan motor (27) at which the airflow rate of air blown out from the outlet port (17) becomes Q1 when the opening degree of the first airflow-rate control damper (8a) increases".

During the normal operation, the controller (50) sets the rotational speed of the fan motor (27) to a rotational speed corresponding to the curve N1 in FIG. 5 so that the measured value of the differential pressure gauge (53) becomes the set differential pressure (P1 in FIG. 5). At this time, the total resistance has a value corresponding to a point a' in FIG. 5.

If the opening degree of the first airflow-rate control damper (8a) is increased when, for example, the airflow to the first room (7a) is to be increased, the air resistance in the blow-out duct (2) decreases in a short time. When the air resistance in the blow-out duct (2) decreases, the airflow rate of air blown out from the outlet port (17) increases from Q1 to Q2, and the measured value at the differential pressure gauge (53) increases from P1 to P2. In other words, the state of the airflow rate and the differential pressure in the air handling unit (1) shifts from the point a to the point b in FIG.

5. Then, the total resistance decreases from a value corresponding to the point a' to a value corresponding to the point b' in a short time.

The controller (50) detects that the measured value of the differential pressure gauge (53) has increased by "a value (a third predetermined value) corresponding to the difference between P1 and P2" or greater within a third predetermined time (in the present embodiment, 10 seconds), and reduces the rotational speed of the fan motor (27) to a rotational speed corresponding to the curve N2 in FIG. 5. Thus, the airflow rate of air blown out from the outlet port (17) decreases from Q2 to Q1, and the measured value at the differential pressure gauge (53) decreases from P2 to P1. In other words, the state of the airflow rate and the differential pressure in the air handling unit (1) shifts from the point b to the point c in FIG. 5. In FIG. 5, the point c is the same as the point a. Then, the total resistance decreases from a value corresponding to the point b' to a value corresponding to the point c'. Thus, the airflow rate of air blown out from the outlet port (17) can be suppressed from becoming excessive.

<Control when Opening Degree of Airflow-Rate Control Damper Decreases>

Figure 6:
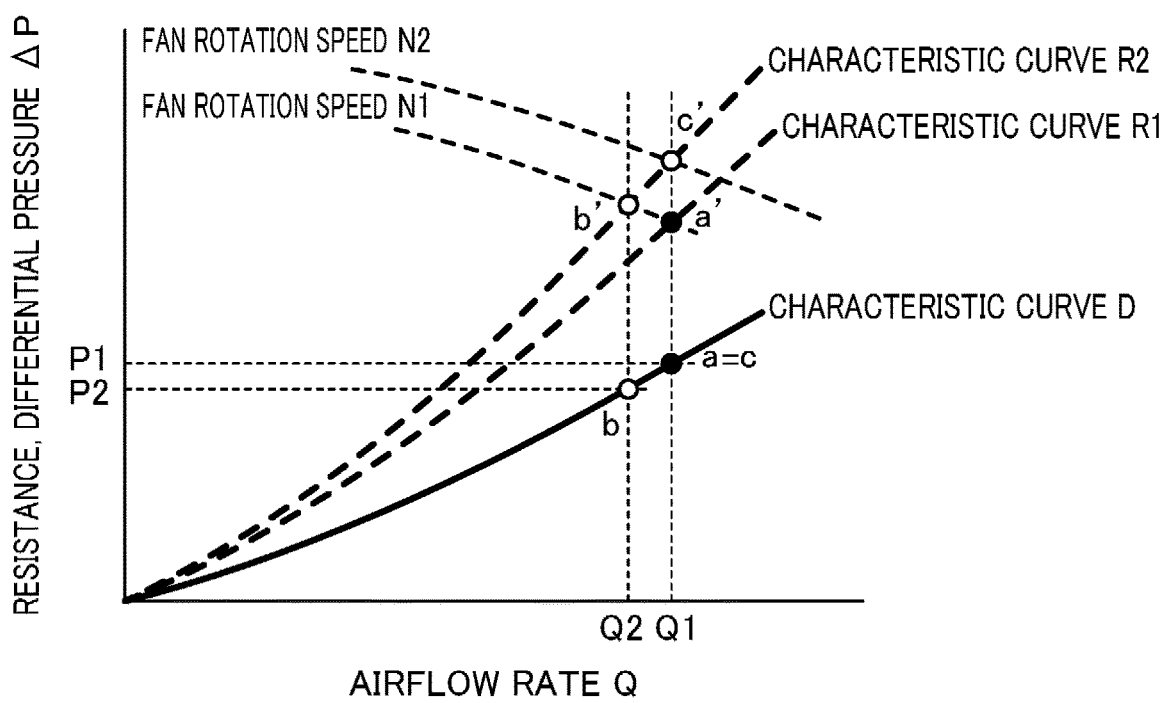
FIG. 6 is a graph illustrating behavior when the opening degree of one damper is reduced in the air handling unit according to the first embodiment.

FIG. 6 is a graph illustrating behavior when the opening degree of, for example, the first airflow-rate control damper (8a), among the airflow-rate control dampers (8a to 8h), decreases in the air handling unit (1).

The characteristic curve D in FIG. 6 represents the relationship between the airflow rate (Q) of air blown out from the outlet port (17) and the measured value of the differential pressure gauge (53). The characteristic curve R1 in FIG. 5 represents the relationship between the airflow rate (Q) of air blown out from the outlet port (17) and the total resistance "at a time when the trial run normally finishes in a state in which each airflow-rate control damper (8a to 8h) is opened" or "at a time when foreign substances adhere to the air filter (21) and the rotational speed of the fan motor (27) is increased". The characteristic curve R2 in FIG. 6 represents the relationship between the airflow rate (Q) of air blown out from the outlet port (17) and the total resistance at a time when the opening degree of the first airflow-rate control damper (8a) decreases from the state of the characteristic curve R1.

The curve N1 in FIG. 6 represents fan characteristics at "the rotational speed of the fan motor (27) controlled so that the measured value of the differential pressure gauge (53) becomes the set differential pressure (P1 in FIG. 6) in the trial run". The curve N2 in FIG. 6 represents fan characteristics "at the rotational speed of the fan motor (27) at which the airflow rate of air blown out from the outlet port (17) becomes Q1 when the opening degree of the first airflow-rate control damper (8a) decreases".

During the normal operation, the controller (50) sets the rotational speed of the fan motor (27) to a rotational speed corresponding to the curve N1 in FIG. 6 so that the measured value of the differential pressure gauge (53) becomes the set differential pressure (P1 in FIG. 6). At this time, the total resistance has a value corresponding to a point a' in FIG. 6.

If the opening degree of the first airflow-rate control damper (8a) is reduced when, for example, the airflow to the first room (7a) is to be reduced, the air resistance in the blow-out duct (2) increases in a short time. When the air resistance in the blow-out duct (2) increases, the airflow rate of air blown out from the outlet port (17) decreases from Q1 to Q2, and the measured value at the differential pressure gauge (53) decreases from P1 to P2. In other words, the state of the airflow rate and the differential pressure in the air handling unit (1) shifts from the point a to the point b in FIG. 6. Then, the total resistance increases from a value corresponding to the point a' to a value corresponding to the point b' in a short time.

The controller (50) detects that the measured value of the differential pressure gauge (53) has decreased by "a value (a fourth predetermined value) corresponding to the difference between P1 and P2" or greater within a fourth predetermined time (in the present embodiment, 10 seconds), and increases the rotational speed of the fan motor (27) to a rotational speed corresponding to the curve N2 in FIG. 6. The fourth predetermined value is less than the first predetermined value described above. Thus, the airflow rate of air blown out from the outlet port (17) increases from Q2 to Q1, and the measured value at the differential pressure gauge (53) increases from P2 to P1. In other words, the state of the airflow rate and the differential pressure in the air handling unit (1) shifts from the point b to the point c in FIG. 6. In FIG. 6, the point c is the same as the point a. Then, the total resistance increases from a value corresponding to the point b' to a value corresponding to the point c'. Thus, the airflow rate of air blown out from the outlet port (17) can be suppressed from becoming deficient.

Advantageous Effects of First Embodiment

As described above, in the trial run, an operator controls the opening degrees of the distribution control dampers (6a, 6b) and the airflow-rate control dampers (8a to 8h) so that the blow-out airflow rate of each of the blow-out ports (9a to 9h) becomes a corresponding set value. When the opening degrees of the distribution control dampers (6a, 6b) and the airflow-rate control dampers (8a to 8h) are changed in a state in which the rotational speed of the fan motor (27) is constant, the blow-out airflow rate of the air handling unit (1) changes, and, as a result, the differential pressure between points in front of and behind the ventilation member (20) changes. Therefore, with existing technologies, the operator has to frequently and repeatedly control the opening degrees of the dampers disposed in the blow-out duct and the rotational speed of the fan motor (27) in the trial run, and thus the man-hours of the trial run is considerably large.

The air handling unit (1) according to the present embodiment is connected via the duct (2) to the plurality of blow-out ports (9a to 9h) formed in the air-conditioning target space (7a, 7b) and that sends air to the blow-out ports (9a to 9h). The air handling unit (1) includes the casing (10) that includes the inlet port (16) that takes in air and the outlet port (17) to which the duct (2) is connected, the casing (10) forming the airflow path extending from the inlet port (16) to the outlet port (17); the fan unit (25) that is disposed in the casing (10) and sends air from the inlet port (16) to the outlet port (17) in the airflow path; the ventilation member (20) that is disposed in the airflow path and allows air to pass therethrough; the differential pressure gauge (53) that measures a differential pressure between points in front of and behind the ventilation member (20); and the controller (50) that adjusts the rotational speed of the fan motor (27) based on the measured value of the differential pressure gauge (53).

With the present embodiment, because the controller (50) controls the rotational speed of the fan motor (27), an operator need only to adjust the opening degrees of the distribution control dampers (6a, 6b) and the airflow-rate control dampers (8a to 8h) during the trial run. Therefore, it is possible to reduce the man-hours of the trial run and to easily adjust the amount of blown-out air.

Moreover, the differential pressure gauge (53) measures the differential pressure between points in front of and behind the ventilation member (20) disposed in the casing (10). Therefore, it is not necessary to carry out works for connecting the controller (50) and the differential pressure gauge (53) outside the air handling unit (1). Accordingly, it is possible to reduce the man-hours of works for installing the air handling unit (1).

In the air handling unit (1) according to the present embodiment, the controller (50) performs the trial run in which the controller (50) controls the rotational speed of the fan motor (27) so that the measured value of the differential pressure gauge (53) becomes a set differential pressure.

With the present embodiment, it is easy to control the airflow rate in the trial run, because the rotational speed of the fan motor (27) is controlled based on the measured value of the differential pressure gauge (53) in the trial run.

In the air handling unit (1) according to the present embodiment, the controller (50) finishes the trial run on condition that the measured value of the differential pressure gauge (53) has become the set differential pressure. Moreover, the air handling unit (1) according to the present embodiment includes the display (57) that notifies that the trial run has finished.

With the present embodiment, it is possible to notify to an operator that the trial run has finished. Therefore, it is possible to improve the operation efficiency of the operator.

In the air handling unit (1) according to the present embodiment, the ventilation member (20) is an air filter (21) that purifies air.

With the present embodiment, the air filter (21) is usually provided in the air handling unit (1). Therefore, it is not necessary to additionally prepare a special member and carry out installation works in order to constitute the ventilation member (20). Moreover, it is possible to adjust the rotational speed of the fan motor (27) by using the differential pressure gauge (53), which has been used to detect clogging of the air filter (21).

In the air handling unit (1) according to the present embodiment, during the normal operation, the controller (50) increases the rotational speed of the fan motor (27) when the measured value of the differential pressure gauge (53) is greater than a set differential pressure.

With the present embodiment, when foreign substances adhere to the air filter (21) and the differential pressure between points in front of and behind the air filter (21) increases, the rotational speed of the fan motor (27) can be increased. Therefore, the airflow rate of air blown out from the outlet port (17) can be suppressed from becoming deficient.

In the air handling unit (1) according to the present embodiment, when receiving a reset signal, the controller (50) returns the rotational speed of the fan motor (27) to a rotational speed at a time when the normal operation started.

With the present embodiment, when an operator replaces the air filter (21) that has trapped foreign substances with a new air filter (21), by pressing the reset switch (41) to transmit a reset signal to the controller (50), the operator can return the rotational speed of the fan motor (27), which has been increased, to the original rotational speed.

In the air handling unit (1) according to the present embodiment, the distribution control damper (6a, 6b) for flow rate control is disposed in the duct (2), and the controller (50) reduces the rotational speed of the fan motor (27) to a first correction speed when the measured value of the differential pressure gauge (53) decreases by a first predetermined value or more within a first predetermined time.

With the present embodiment, when the first distribution control damper (6a) is fully closed, the air resistance in the blow-out duct (2) increases in a short time. When the air resistance in the blow-out duct (2) increases, the airflow rate of air blown out from the outlet port (17) decreases, and the measured value at the differential pressure gauge (53) decreases in a short time. Moreover, because the first distribution control damper (6a) is fully closed, the flow rate of air that flows in the second blow-out duct (2b) increases. Therefore, with the present embodiment, the airflow to the second room (7b) can be suppressed from becoming excessive.

In the air handling unit (1) according to the present embodiment, the controller (50) increases the rotational speed of the fan motor (27) when the fan motor (27) rotates at the first correction speed and the measured value of the differential pressure gauge (53) increases by a second predetermined value or more within in a second predetermined time.

With the present embodiment, if the first distribution control damper (6a), which has been fully closed, is returned to the original opening degree when the fan motor (27) is rotating at the first correction speed, the air resistance in the blow-out duct (2) decreases in a short time. When the air resistance in the blow-out duct (2) decreases, the airflow rate of air blown out from the outlet port (17) increases, and the measured value at the differential pressure gauge (53) increases in a short time. Therefore, with the present embodiment, the rotational speed of the fan motor (27), which has been reduced to the first correction speed, can be returned to the original rotational speed.

In the air handling unit (1) according to the present embodiment, the airflow-rate control damper (8a to 8h) for flow rate control is disposed in the duct (2), and the controller (50) reduces the rotational speed of the fan motor (27) when the measured value of the differential pressure gauge (53) increases by a third predetermined value or more within a third predetermined time.

With the present embodiment, when the opening degree of the first airflow-rate control damper (8a) is increased, the air resistance in the blow-out duct (2) decreases in a short time. When the air resistance in the blow-out duct (2) decreases, the airflow rate of air blown out from the outlet port (17) increases, and the measured value at the differential pressure gauge (53) increases in a short time. Therefore, with the present embodiment, by reducing the rotational speed of the fan motor (27), the airflow rate of air blown out from the outlet port (17) can be suppressed from becoming excessive.

In the air handling unit (1) according to the present embodiment, the controller (50) increases the rotational speed of the fan motor (27) when the measured value of the differential pressure gauge (53) decreases by a fourth predetermined value or more within a fourth predetermined time.

With the present embodiment, when the opening degree of the first airflow-rate control damper (8a) is reduced, the air resistance in the blow-out duct (2) increases in a short time. When the air resistance in the blow-out duct (2) increases, the airflow rate of air blown out from the outlet port (17) decreases, and the measured value at the differential pressure gauge (53) decreases in a short time. Therefore, with the present embodiment, the airflow rate of air blown out from the outlet port (17) can be suppressed from becoming deficient.

The air handling unit (1) according to the present embodiment includes the flow-regulating member (42a, 42b) that is provided in the airflow path and suppresses turbulence of airflow.

With the present embodiment, by suppressing turbulence of airflow in the airflow path, variation in the measured value of the differential pressure gauge (53) can be reduced.

The air handling unit (1) according to the present embodiment includes the display (57) that displays an airflow rate that is converted from the measured value of the differential pressure gauge (53).

With the present embodiment, an operator can easily check the airflow rate.

Second Embodiment

A second embodiment will be described. An air handling unit (1) according to the present embodiment is the air handling unit (1) according to the first embodiment, in which the positions of the differential pressure take-out pipes (54a, 54b) of the differential pressure gauge (53) are changed. Here, regarding the air handling unit (1) according to the present embodiment, differences from the air handling unit (1) according to the first embodiment will be described.

Figure 7:
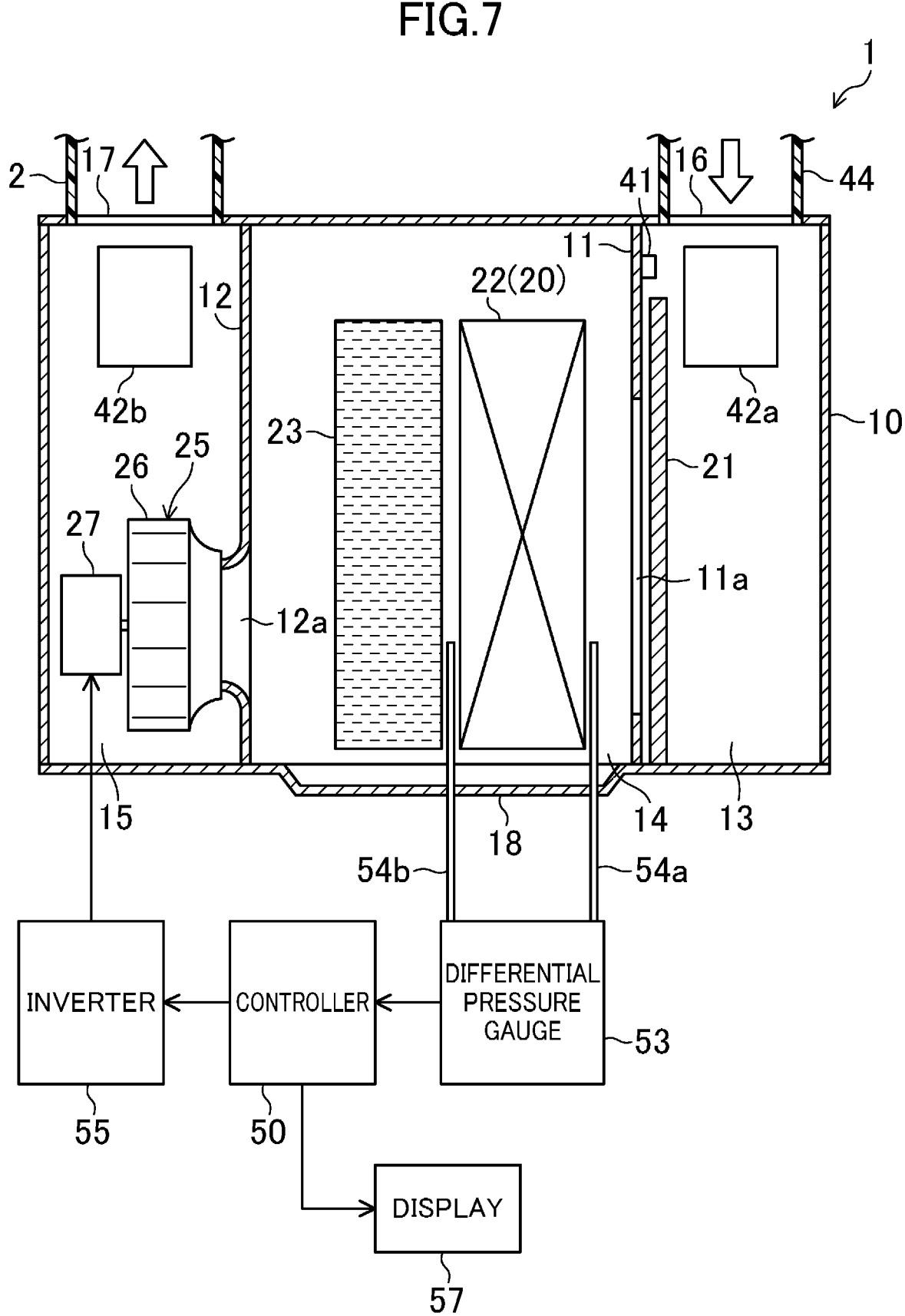
FIG. 7 is a view, corresponding to FIG. 2, of a second embodiment.

As illustrated in FIG. 7, the differential pressure gauge (53) measures the differential pressure between points in front of and behind the heat exchanger (22). An end of the upstream differential pressure take-out pipe (54a) is positioned on the upstream side of the heat exchanger (22). An end of the downstream differential pressure take-out pipe (54b) is positioned on the downstream side of the heat exchanger (22). Accordingly, in the present embodiment, the ventilation member (20) is the heat exchanger (22).

—Operation—
<Control when Air Filter is Clogged>

Figure 8:
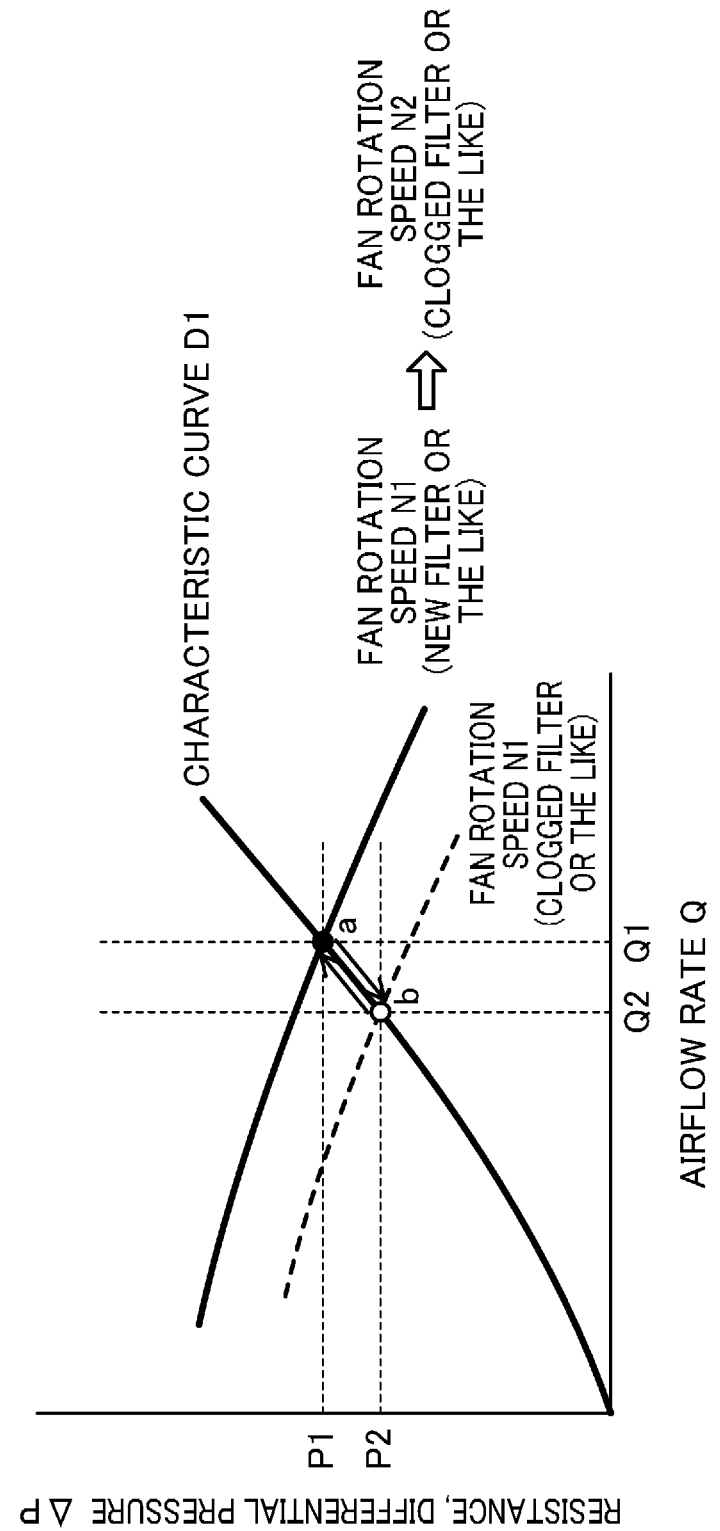
FIG. 8 is a view, corresponding to FIG. 3, of the second embodiment.

FIG. 8 is a graph illustrating behavior when the air filter (21) is clogged in the air handling unit (1) according to the present embodiment. The characteristic curve D1 in FIG. 8 represents the relationship between the airflow rate (Q) of air blown out from the outlet port (17) and the measured value of the differential pressure gauge (53).

For example, in a normal operation immediately after the trial run has normally finished, the controller (50) operates the fan motor (27) at a speed controlled in the trial run so that the measured value of the differential pressure gauge (53) becomes the set differential pressure (P1 in FIG. 8). At this time, the airflow rate of air blown out from the outlet port (17) becomes the symbol Q1 in FIG. 8.

As the operation time of the normal operation elapses, foreign substances adhere to the air filter (21). Therefore, the airflow rate through the heat exchanger (22) decreases to Q2 in FIG. 8. As a result, the measured value of the differential pressure gauge (53) becomes less than the set differential pressure and becomes P2 in FIG. 8. That is, the state of the airflow rate and the differential pressure in the air handling unit (1) shifts from the point a to the point b in FIG. 8.

The controller (50) increases the rotational speed of the fan motor (27) in accordance with the difference between the measured value of the differential pressure gauge (53) (P2 in FIG. 8) and the set differential pressure (P1 in FIG. 8). At this time, the larger the difference between the measured value of the differential pressure gauge (53) and the set differential pressure, the rotational speed of the fan motor (27) is increased by a larger amount. Thus, the relationship between the airflow rate (Q) and the differential pressure (P) returns from the point b to the point a in FIG. 8, and the airflow rate of air blown out from the outlet port (17) returns to Q1 in FIG. 8. Accordingly, even when foreign substances adhere to the air filter (21), the airflow rate of air blown out from the outlet port (17) can be suppressed from decreasing.

Advantageous Effects of Second Embodiment

In the air handling unit (1) according to the present embodiment, the ventilation member (20) is the heat exchanger (22) that adjusts the temperature of air.

With the present embodiment, the heat exchanger (22) is usually provided in the air handling unit (1). Therefore, it is not necessary to additionally prepare a special member and carry out installation works in order to constitute the ventilation member (20).

In the air handling unit (1) according to the present embodiment, during the normal operation, the controller (50) increases the rotational speed of the fan motor (27) when the measured value of the differential pressure gauge (53) is greater than a set differential pressure.

With the present embodiment, when foreign substances adhere to the air filter (21) and the airflow rate of air that flows through the heat exchanger (22) decreases, the rotational speed of the fan motor (27) can be increased. Therefore, the airflow rate of air blown out from the outlet port (17) can be suppressed from becoming deficient.

Third Embodiment

A third embodiment will be described. An air handling unit (1) according to the present embodiment is the air handling unit (1) according to the above-described embodiment, in which the differential pressure gauge (53) is provided only during the trial run. Here, regarding the air handling unit (1) according to the present embodiment, differences from the air handling unit (1) according to the above-described embodiment will be described.

Figure 9:
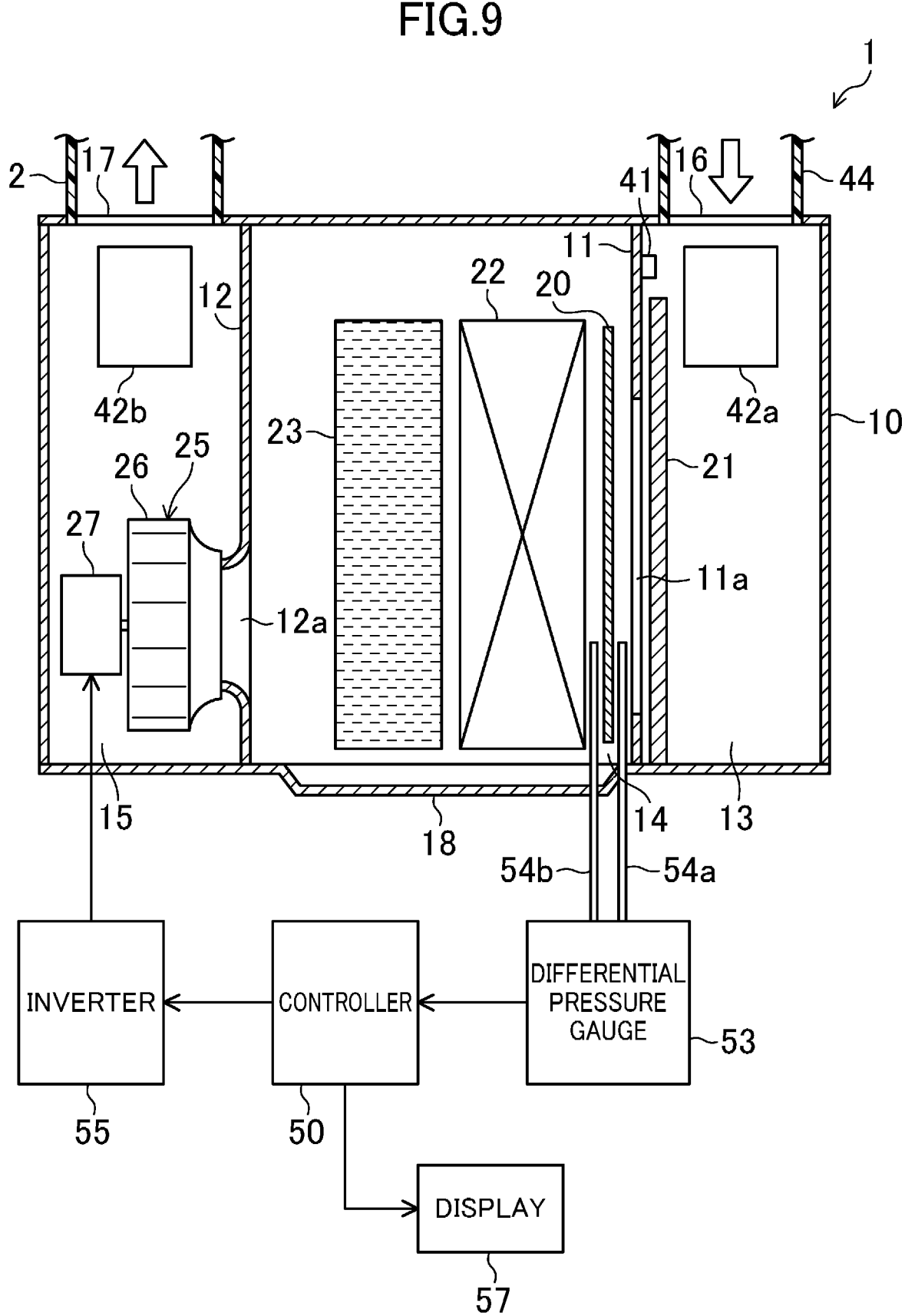
FIG. 9 is a schematic view illustrating the configuration of an air handling unit according to a third embodiment during a trial run.

FIG. 9 illustrates the configuration of the air handling unit (1) during the trial run. In the present embodiment, after the air handling unit (1) has been installed in the machine room (4) and before the trial run is performed, the ventilation member (20) is installed between the air filter (21) and the heat exchanger (22) in the airflow path (ventilation-member installing step). The ventilation member (20) may be any member that allows air to pass therethrough, and may be, for example, a perforated board having a plurality of through-holes. Then, the differential pressure gauge (53) is installed so that the differential pressure gauge (53) can measure the differential pressure between points in front of and behind the ventilation member (20). To be specific, the differential pressure gauge (53) is installed in such a way that an end of the upstream differential pressure take-out pipe (54a) is positioned on the upstream side of the ventilation member (20) and an end of the downstream differential pressure take-out pipe (54b) is positioned on the downstream side of the ventilation member (20).

In the trial run, the controller (50) controls the rotational speed of the fan motor (27) based on the differential pressure between points in front of and behind the ventilation member (20) (rotational-speed controlling step). Then, when the trial run finishes, an operator removes the ventilation member (20) and the differential pressure gauge (53) from the air handling unit (1) (ventilation-member removing step). That is, with the present embodiment, the normal operation is performed in a state in which the differential pressure gauge (53) is removed from the air handling unit (1).

Advantageous Effects of Third Embodiment

The method for controlling the rotational speed of the fan unit (25) of the air handling unit (1) according to the present embodiment includes: the ventilation-member installing step of installing the ventilation member (20) in the airflow path before the rotational-speed controlling step; and the ventilation-member removing step of removing the ventilation member (20) after the rotational-speed controlling step.

With the present embodiment, it is possible to install the ventilation member (20) in the rotational-speed controlling step, in which the ventilation member (20) is necessary, and to remove the ventilation member (20) after the rotational-speed controlling step.

Other Embodiments

Each the above-described embodiments may be configured as follows.

In each of the above-described embodiments, during the normal operation, when the measured value of the differential pressure gauge (53) decreases by the first predetermined value or more within the first predetermined time, the controller (50) reduces the rotational speed of the fan motor (27) to the first correction speed. However, this control may be performed in the trial run.

In each of the above-described embodiments, during the normal operation, when the measurement value of the differential pressure gauge (53) increases by the third predetermined value or more within the third predetermined time, the controller (50) reduces the rotational speed of the fan motor (27). However, this control may be performed in the trial run.

In each of the above-described embodiments, during the normal operation, when the measured value of the differential pressure gauge (53) decreases by the fourth predetermined value or more within the fourth predetermined time, the controller (50) increases the rotational speed of the fan motor (27). However, this control may be performed in the trial run.

In each of the above-described embodiments, the flow-regulating members (42a, 42b) are disposed in both of the inlet chamber (13) and the outlet chamber (15). However, the flow-regulating member (42) may be disposed in one of the inlet chamber (13) and the outlet chamber (15), or the flow-regulating members (42a, 42b) need not be provided.

In each of the above-described embodiments, in the trial run, in the rotational-speed controlling step, the controller (50) controls the rotational speed of the fan motor (27) based on the differential pressure between points in front of and behind the ventilation member (20) by using the inverter (55). However, the controller (50) need not be configured to be capable of communicating with the inverter (55). In this case, in the rotational-speed controlling step, an operator manually adjusts the inverter (55) while referring to the airflow rate displayed on the display (57).

It should be understood that the embodiments and modifications described above can be modified in configuration and details within the sprit and scope of the claims. The embodiments and modifications described above may be combined or replaced as necessary, as long as the function of the object of the present disclosure is not impaired.

INDUSTRIAL APPLICABILITY

As heretofore described, the present disclosure is applicable to an air conditioning apparatus and a method for controlling the rotational speed of a fan.

EXPLANATION OF REFERENCES 1 air handling unit (air conditioning apparatus)
2 blow-out duct (duct)
6a, 6b distribution control damper (damper)
7a first room (air-conditioning target space)
7b second room (air-conditioning target space)
8a to 8h airflow-rate control damper (damper)
9a to 9h blow-out port
10 casing
16 inlet port
17 outlet port
20 ventilation member
21 air filter
22 heat exchanger
25 fan unit (fan)
42a inlet flow-regulating member (flow-regulating member)
42b outlet flow-regulating member (flow-regulating member)
50 controller
53 differential pressure gauge
57 display (notifying unit, display unit)

The invention claimed is:

1. An air conditioning apparatus that is connected via a duct to a plurality of blow-out ports formed in an air-conditioning target space and that sends air to the blow-out ports, comprising:
   a casing that includes an inlet port that takes in air and an outlet port to which the duct is connected, the casing forming an airflow path extending from the inlet port to the outlet port;
   a fan that is disposed in the casing and sends air from the inlet port to the outlet port in the airflow path;
   a member that allows air to pass therethrough and that is disposed in the airflow path;
   a differential pressure gauge that measures a differential pressure between an upstream side and a downstream side, in an air flow direction, of the member that allows air to pass therethrough, the differential pressure gauge having an upstream pressure take-out provided directly opposing an upstream surface of the member that allows air to pass therethrough, and a downstream pressure take-out provided directly opposing a downstream surface of the member that allows air to pass therethrough; and
   a controller that adjusts a rotational speed of the fan based on a measured value of the differential pressure gauge.

2. The air conditioning apparatus according to claim 1, wherein the controller performs a trial run in which the controller controls the rotational speed of the fan so that the measured value of the differential pressure gauge becomes a set differential pressure.

3. The air conditioning apparatus according to claim 2, wherein the controller finishes the trial run on condition that the measured value of the differential pressure gauge has become the set differential pressure, and
wherein the air conditioning apparatus further includes a notifier that notifies that the trial run has finished.

4. The air conditioning apparatus according to claim 1, wherein the member that allows air to pass therethrough is an air filter that purifies air.

5. The air conditioning apparatus according to claim 1, wherein the member that allows air to pass therethrough is a heat exchanger that adjusts a temperature of air that passes therethrough.

6. The air conditioning apparatus according to claim 4, wherein, during a normal operation, the controller increases the rotational speed of the fan when the measured value of the differential pressure gauge is greater than a set differential pressure.

7. The air conditioning apparatus according to claim 5, comprising:
an air filter that is disposed in the airflow path and purifies air,
wherein, during a normal operation, the controller increases the rotational speed of the fan when the measured value of the differential pressure gauge is less than a set differential pressure.

8. The air conditioning apparatus according to claim 6, wherein, when receiving a reset signal, the controller returns the rotational speed of the fan to a rotational speed at a time when the normal operation started.

9. The air conditioning apparatus according to claim 7, wherein, when receiving a reset signal, the controller returns the rotational speed of the fan to a rotational speed at a time when the normal operation started.

10. The air conditioning apparatus according to claim 1, wherein a variable-opening damper for flow rate control is disposed in the duct, and
wherein the controller reduces the rotational speed of the fan to a first correction speed when the measured value of the differential pressure gauge decreases by a first predetermined value or more within a first predetermined time.

11. The air conditioning apparatus according to claim 10, wherein the controller increases the rotational speed of the fan when the fan rotates at the first correction speed and the measured value of the differential pressure gauge increases by a second predetermined value or more within a second predetermined time.

12. The air conditioning apparatus according to claim 1, wherein a variable-opening damper for flow rate control is disposed in the duct, and
wherein the controller reduces the rotational speed of the fan when the measured value of the differential pressure gauge increases by a predetermined value or more within a predetermined time.

13. The air conditioning apparatus according to claim 1, wherein a variable-opening damper for flow rate control is disposed in the duct, and
wherein the controller increases the rotational speed of the fan when the measured value of the differential pressure gauge decreases by a predetermined value or more within a predetermined time.

14. The air conditioning apparatus according to claim 1, comprising:
a flow-regulator that is provided in the airflow path and suppresses turbulence of airflow.

15. The air conditioning apparatus according to claim 1, comprising:
a display unit that displays an airflow rate that is converted from the measured value of the differential pressure gauge.

16. A method for controlling a rotational speed of a fan of an air conditioning apparatus that includes a casing in which an inlet port and an outlet port for air are formed and a fan that is disposed in the casing and sends air from the inlet port to the outlet port in an airflow path extending from the inlet port to the outlet port,
the method comprising a rotational-speed controlling step of controlling a rotational speed of the fan based on a differential pressure between a pressure of an upstream side, in an airflow direction, of a member that allows air to pass therethrough and that is disposed in the airflow path and at a location directly opposing an upstream surface of the member that allows air to pass therethrough; and a pressure of a downstream side, in the air flow direction, of the member that allows air to pass therethrough and at a location directly opposing a downstream surface of the member that allows air to pass therethrough.

17. The method for controlling a rotational speed of a fan according to claim 16,
wherein, in the rotational-speed controlling step, an air filter that is provided in the airflow path and purifies air is used as the member that allows air to pass therethrough.

18. The method for controlling a rotational speed of a fan according to claim 16,
wherein, in the rotational-speed controlling step, a heat exchanger that is provided in the airflow path and adjusts a temperature of air is used as the member that allows air to pass therethrough.

19. The method for controlling a rotational speed of a fan according to claim 16, comprising:
a member installing step of installing the member that allows air to pass therethrough in the airflow path before the rotational-speed controlling step; and
a member removing step of removing the member that allows air to pass therethrough after the rotational-speed controlling step.

* * * * *